US010618741B2

(12) United States Patent
Schnupper et al.

(10) Patent No.: US 10,618,741 B2
(45) Date of Patent: Apr. 14, 2020

(54) APPARATUS FOR SELECTIVELY PROCESSING EGGS, AND ASSOCIATED METHOD

(71) Applicant: Zoetis Services LLC, Parsippany, NJ (US)

(72) Inventors: Michael Glenn Schnupper, Raleigh, NC (US); Ramin Karimpour, Raleigh, NC (US); Thomas Zelmer, Garner, NC (US); Daniel Scott Rees, Zebulon, NC (US); Steven Jay Edwards, Apex, NC (US)

(73) Assignee: Zoetis Services LLC, Parsippany, NJ (US)

( * ) Notice: Subject to any disclaimer, the term of this patent is extended or adjusted under 35 U.S.C. 154(b) by 494 days.

(21) Appl. No.: 14/479,433

(22) Filed: Sep. 8, 2014

(65) Prior Publication Data

US 2015/0071741 A1    Mar. 12, 2015

Related U.S. Application Data

(60) Provisional application No. 61/875,814, filed on Sep. 10, 2013.

(51) Int. Cl.
*B65G 25/04* (2006.01)
*A01K 45/00* (2006.01)
(Continued)

(52) U.S. Cl.
CPC .............. *B65G 25/04* (2013.01); *A01K 43/00* (2013.01); *A01K 45/007* (2013.01); *A23L 15/00* (2016.08)

(58) Field of Classification Search
CPC ........ A01K 45/007; A01K 45/00; A01K 43/00
(Continued)

(56) References Cited

U.S. PATENT DOCUMENTS 4,469,047 A * 9/1984 Miller .................. A01K 45/007
119/6.8
4,681,063 A * 7/1987 Hebrank .............. B65G 47/915
119/6.8
(Continued)

FOREIGN PATENT DOCUMENTS

AR          075720        4/2011
EP       2649877 A1      10/2013
WO    WO 2010/151108 A1  12/2010

OTHER PUBLICATIONS

PCT International Preliminary Report on Patentability, International Application No. PCT/US2014/054546, dated Mar. 7, 2016.
(Continued)

*Primary Examiner* — Christopher D Hutchens
(74) *Attorney, Agent, or Firm* — Scott C. Mayhew

(57) ABSTRACT

An egg processing apparatus is provided. Such an apparatus includes a processing head and processing devices associated therewith. Each processing device has an end configured to interact with an avian egg. Each processing device is capable of being selectively held in a non-contact or contact position with respect to an avian egg during a processing sequence such that a first subset of the processing devices is in the non-contact position while simultaneously having a second subset of the processing devices in the contact position. An associated method is also provided.

15 Claims, 11 Drawing Sheets

(51) Int. Cl.
*A23L 15/00* (2016.01)
*A01K 43/00* (2006.01)

(58) Field of Classification Search
USPC .......................................................... 119/6.8
See application file for complete search history.

(56) References Cited

U.S. PATENT DOCUMENTS

| | | | | |
|---|---|---|---|---|
| 4,903,635 | A * | 2/1990 | Hebrank | A01K 43/10 119/6.8 |
| 5,056,464 | A * | 10/1991 | Lewis | A01K 45/007 119/6.8 |
| 5,136,979 | A * | 8/1992 | Paul | A61D 19/04 119/6.8 |
| 5,176,101 | A * | 1/1993 | Paul | A01K 45/007 119/6.8 |
| 5,898,488 | A | 4/1999 | Kuhl | |
| 5,900,929 | A * | 5/1999 | Hebrank | A01K 45/007 356/52 |
| 6,149,375 | A | 11/2000 | Hebrank | |
| 6,213,709 | B1 | 4/2001 | Hebrank | |
| 6,240,877 | B1 * | 6/2001 | Bounds | A01K 45/007 119/6.8 |
| 6,499,428 | B1 * | 12/2002 | Prindle | A01K 45/007 119/6.8 |
| 7,041,439 | B2 | 5/2006 | Phelps et al. | |
| 7,083,208 | B2 | 8/2006 | Ilich | |
| 7,721,674 | B2 * | 5/2010 | Smith | A61D 1/025 119/6.8 |
| 8,307,784 | B2 * | 11/2012 | Nadreau | A01K 45/007 119/6.8 |
| 9,517,616 | B2 * | 12/2016 | Mueller | B65H 3/0883 |
| 2002/0075476 | A1 | 6/2002 | Chalker, II et al. | |
| 2003/0056729 | A1 * | 3/2003 | Correa | A01K 45/007 119/6.8 |
| 2006/0156989 | A1 | 7/2006 | Hebrank | |
| 2010/0307419 | A1 | 12/2010 | Nadreau et al. | |
| 2012/0222621 | A1 * | 9/2012 | Correa | A01K 45/007 119/6.8 |
| 2013/0213303 | A1 * | 8/2013 | Comte | A01K 45/007 119/6.8 |
| 2015/0327520 | A1 * | 11/2015 | Van De Zande | A61D 1/025 119/6.8 |

OTHER PUBLICATIONS

PCT Search Report with Written Opinion, International Application No. PCT/US2014/054546, dated Nov. 26, 2014.
Australian Government, IP Australia, Examination report No. 2 for standard patent application, AU Application No. 2014318043, dated Jul. 11, 2018.
European Patent Office, Annex to Communication No. 2, EPO Application No. 14767260.4, dated Jul. 6, 2018.

* cited by examiner

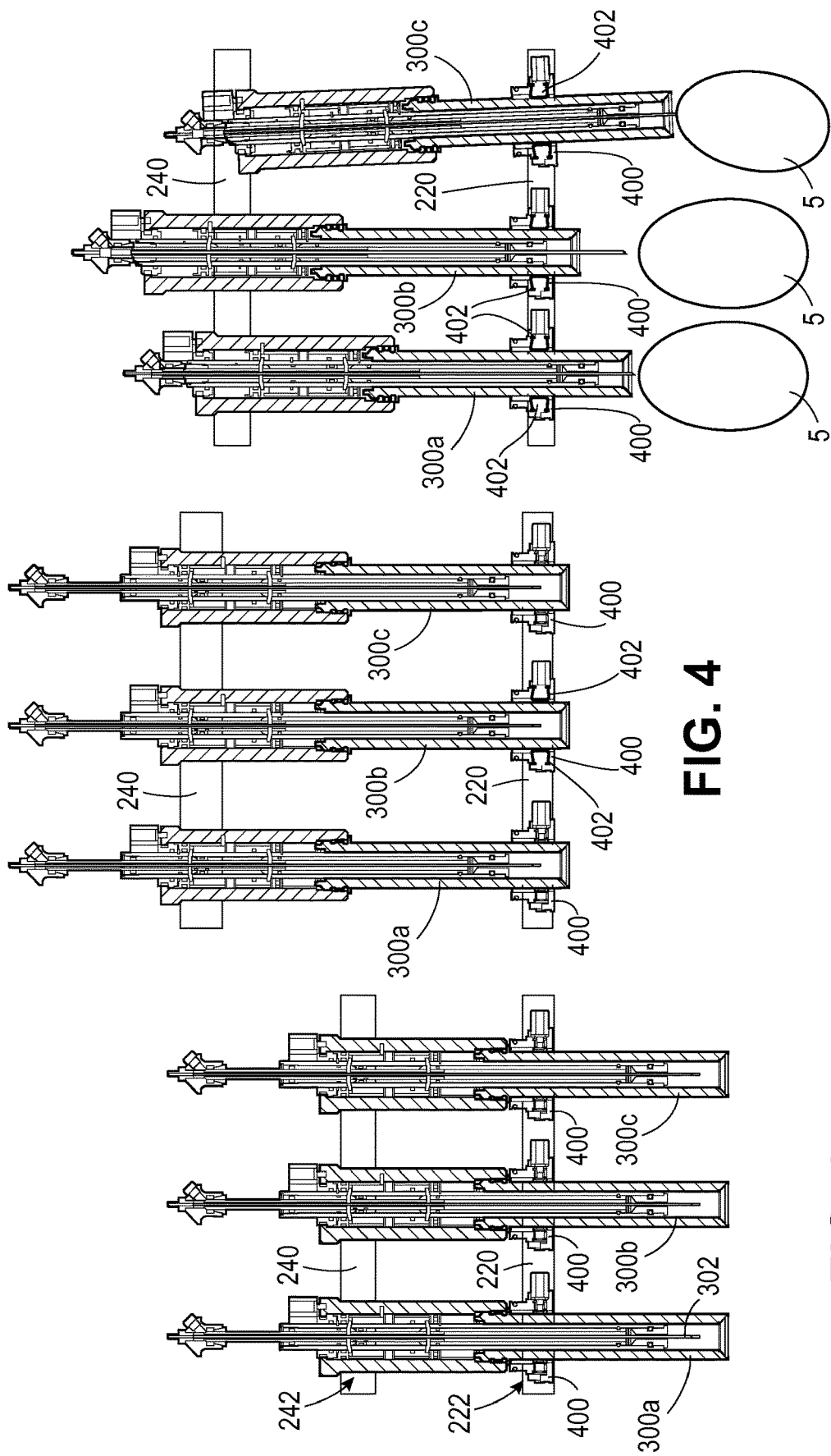

APPARATUS FOR SELECTIVELY PROCESSING EGGS, AND ASSOCIATED METHOD

CROSS REFERENCE TO RELATED APPLICATION

This application claims the benefit of U.S. Provisional Patent Application No. 61/875,814, filed Sep. 10, 2013, which is expressly incorporated herein by reference in its entirety.

TECHNICAL FIELD

The present disclosure generally relates to egg processing devices and systems. More particularly, the present disclosure relates to an avian egg processing system capable of selectively interacting with eggs contained within a flat or container, and an associated method.

BACKGROUND

Various mechanical egg processing systems are used to process avian eggs within a poultry hatchery facility. Such mechanical egg processing systems may include, for example, a transfer system for transferring eggs from a tray associated with a setter incubator (commonly referred to as a "flat") to a container associated with a hatcher incubator (commonly referred to as a "hatching basket"). In other instances, an example of such mechanical egg processing systems may include an egg removal system for removing certain eggs from the flats. In some instances, such mechanical egg processing systems may combine features from the transfer system and the egg removal system. Still another example of such mechanical egg processing systems may include an in ovo injection system for injecting a treatment substance into the eggs. Finally, another example of such mechanical egg processing systems may include a sampling system for removing a sample material from the eggs for analysis.

Typically, the eggs enter any one of these mechanical egg processing systems in egg flats. At any point during or prior to processing by the mechanical egg processing systems, the eggs may be subjected to a candling procedure, which may be either a manual or automated process. The candling procedure identifies or otherwise classifies the eggs according to a predetermined classification scheme (generally, viable or non-viable). During manual candling, the eggs may be physically marked (e.g., with a marker) by a worker according to the classification scheme or otherwise processed (e.g., removed from the flat) by the worker according to the classification. In automated candling systems, each egg may receive a classification status and a corresponding classification signal that can be transferred to a controller system (or to the mechanical egg processing system) for appropriate processing thereof. For example, the candling system may identify eggs within a flat as either viable or non-viable. The candling system may then transmit that classification information to an egg removal system such that all the eggs classified as non-viable are removed from the flat.

Eggs processed within such mechanical egg processing systems may include eggs that are classified as non-viable (i.e., those eggs not containing a viable embryo according to the candling system), which may be further sub-classified as, for example, infertile, rotten, or dead eggs. In this regard, the non-viable eggs may undesirably transfer biological material to components of the mechanical egg processing system during interaction therewith. Such biological material transferred to the components of the mechanical egg processing system may then be transferred to the next egg interacting with the same respective component during subsequent processing of the next flat. That is, by interacting with non-viable eggs, the potential exists for the components of the mechanical egg processing system to facilitate transfer of the biological material of non-viable eggs to viable eggs. Furthermore, in some instances, eggs may become pressurized due to bacterial build-up therewithin such that any contact therewith may cause the egg to explode (a so-called "popper").

Accordingly, it would be desirable to provide an egg processing system capable of selectively directing interaction of its components with eggs contained within an egg flat in either an engaging or non-engaging manner so as to control interaction with undesirable eggs. Furthermore, it would be desirable to provide an associated method that would facilitate selective interaction of mechanical components of an egg processing system with eggs, according to an egg classifications scheme.

BRIEF SUMMARY

The above and other needs are met by aspects of the present disclosure which, according to one aspect, provides an egg processing apparatus having an egg processing head. A plurality of processing devices is operably engaged with the egg processing head so as to be capable of moving in a substantially vertical direction thereby. Each processing device has an end configured to interact with an avian egg. Each processing device is capable of being selectively held in one of a non-contact position and a contact position during a processing sequence such that a first subset of the processing devices is in the non-contact position while simultaneously having a second subset of the processing devices in the contact position.

Another aspect provides a method of selectively processing eggs. The method comprises retracting a plurality of processing devices that are in alignment with a plurality of avian eggs. The method further comprises securing a first subset of the processing devices in a non-contact position. The method further comprises advancing a second subset of the processing devices to engage respective avian eggs aligned therewith. The method further comprises securing the second subset of processing devices in a contact position. The method further comprises processing the avian eggs engaged with the second subset of processing devices.

Thus, various aspects of the present disclosure provide advantages, as otherwise detailed herein.

BRIEF DESCRIPTION OF THE DRAWINGS

Figure 1:
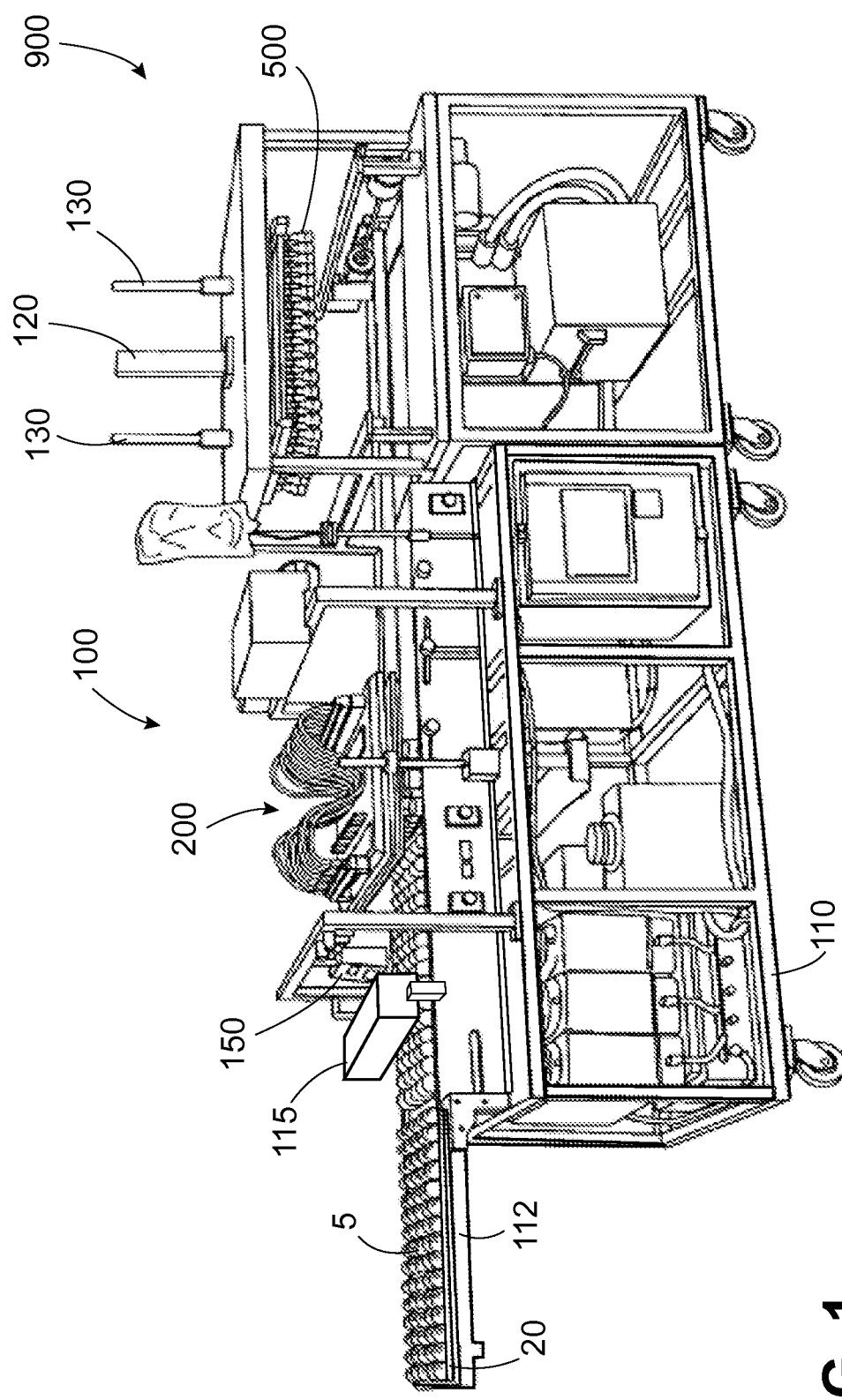
Figure 2:
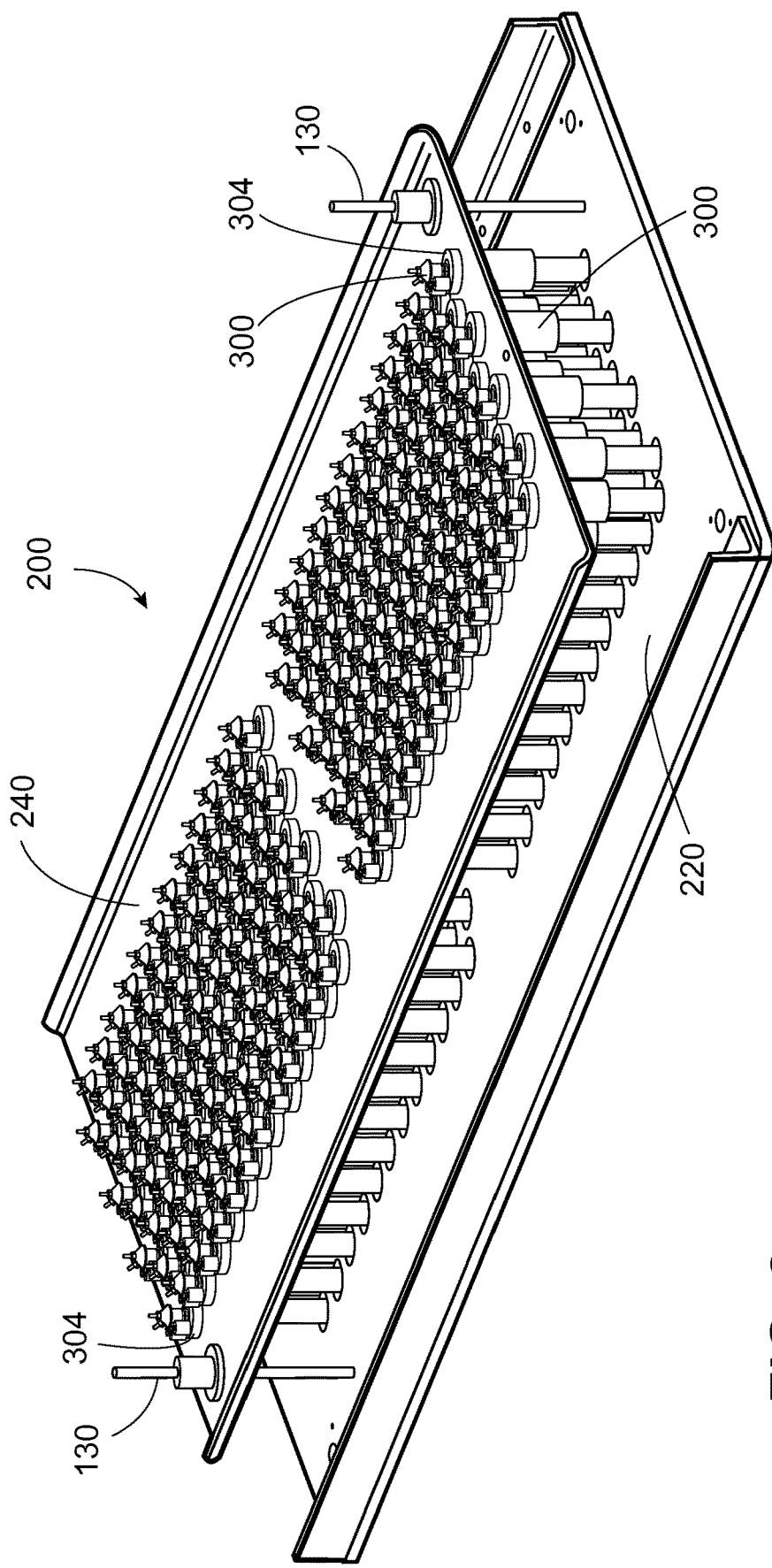
Figure 6:
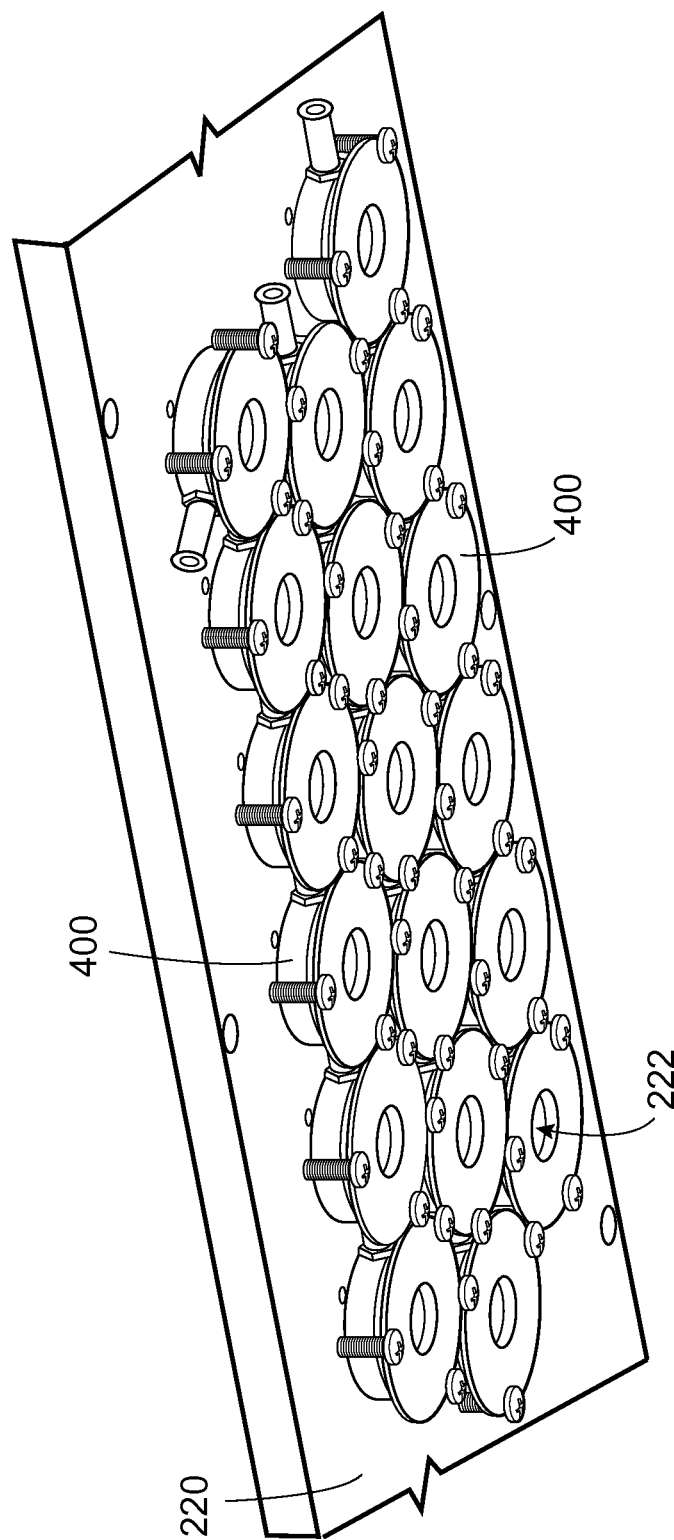
Figure 8:
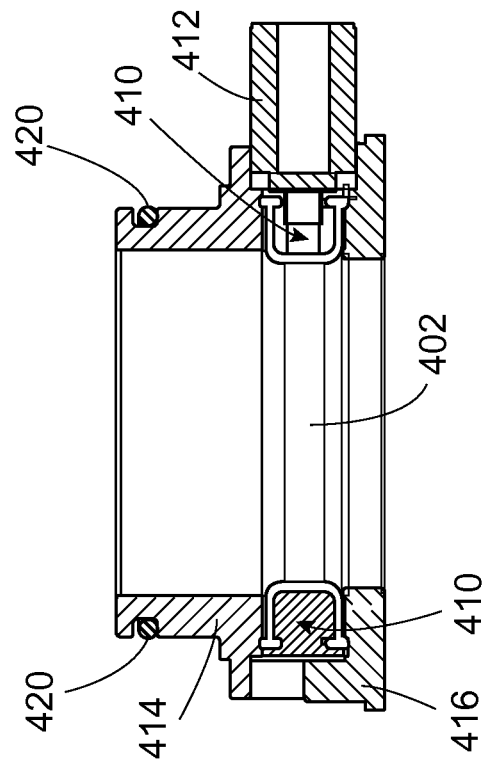
Figure 7:
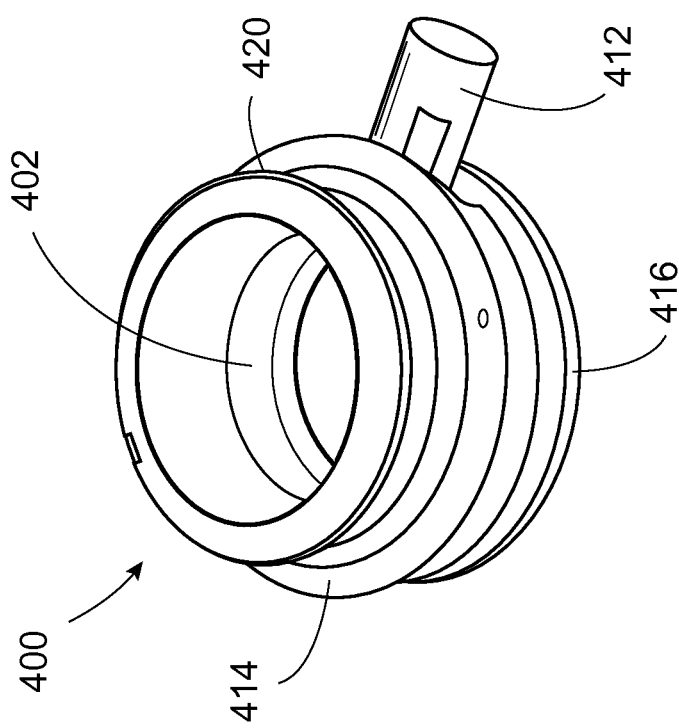
Figure 9:
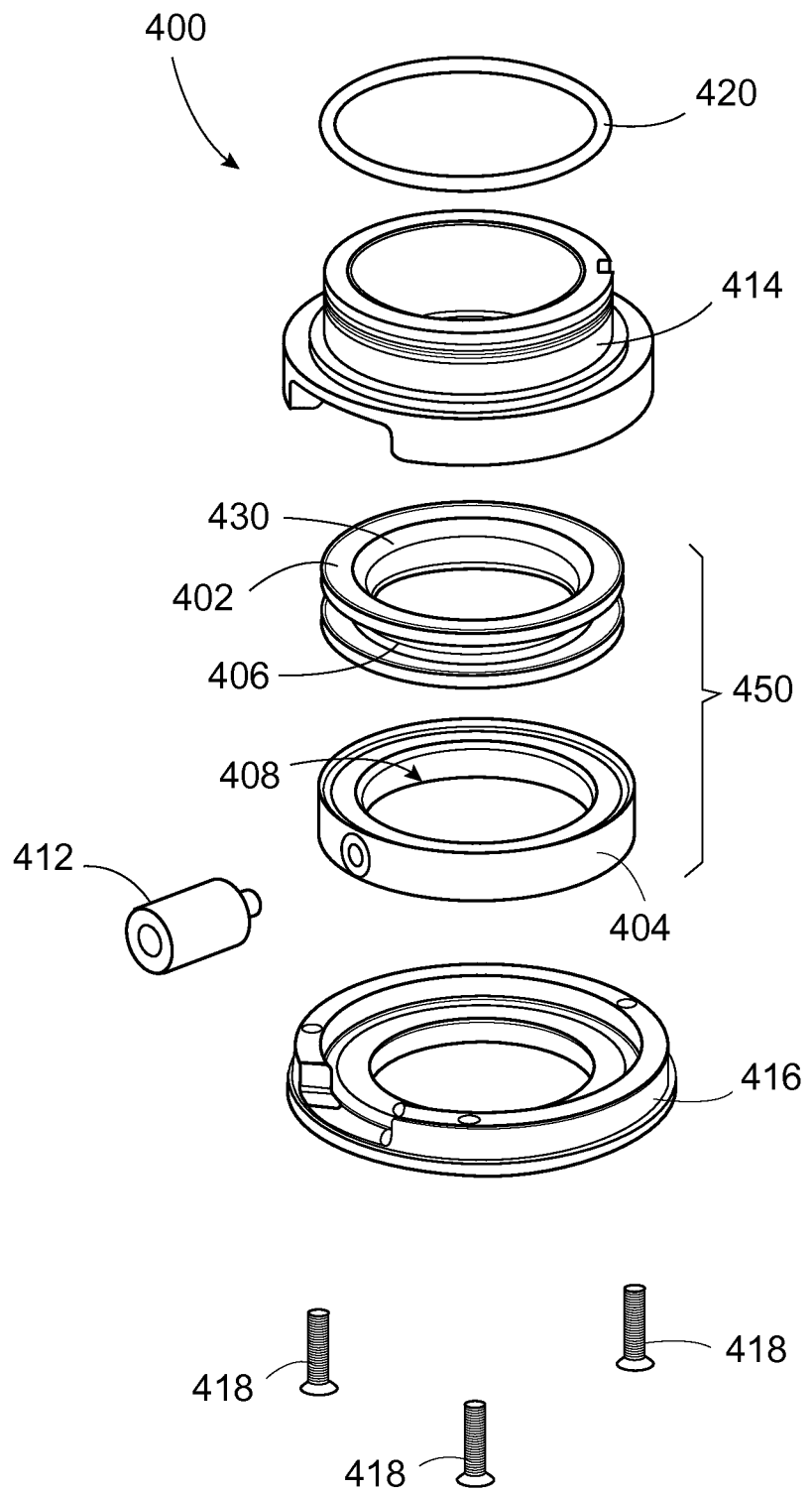
Figure 10:
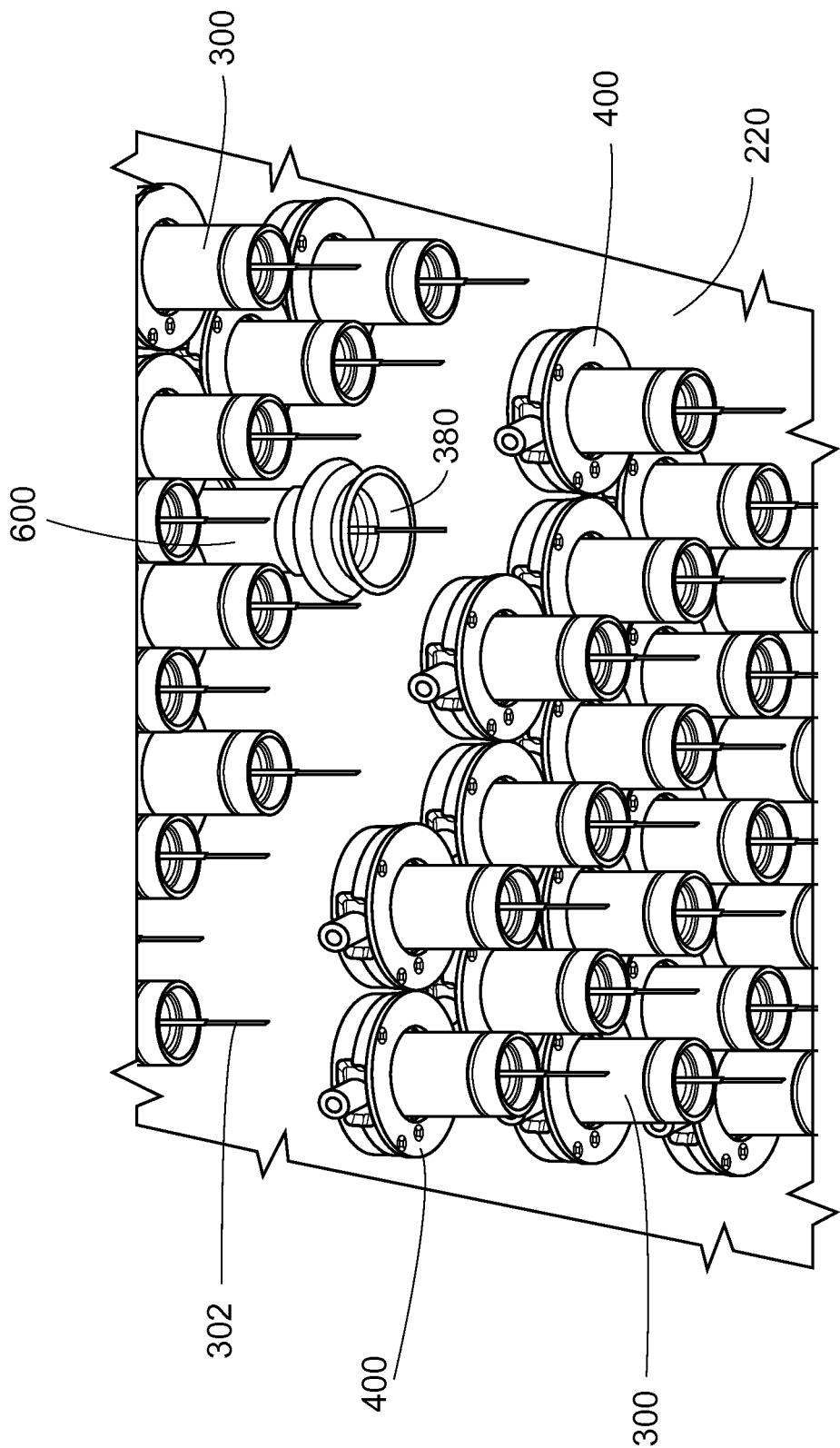
Figure 11:
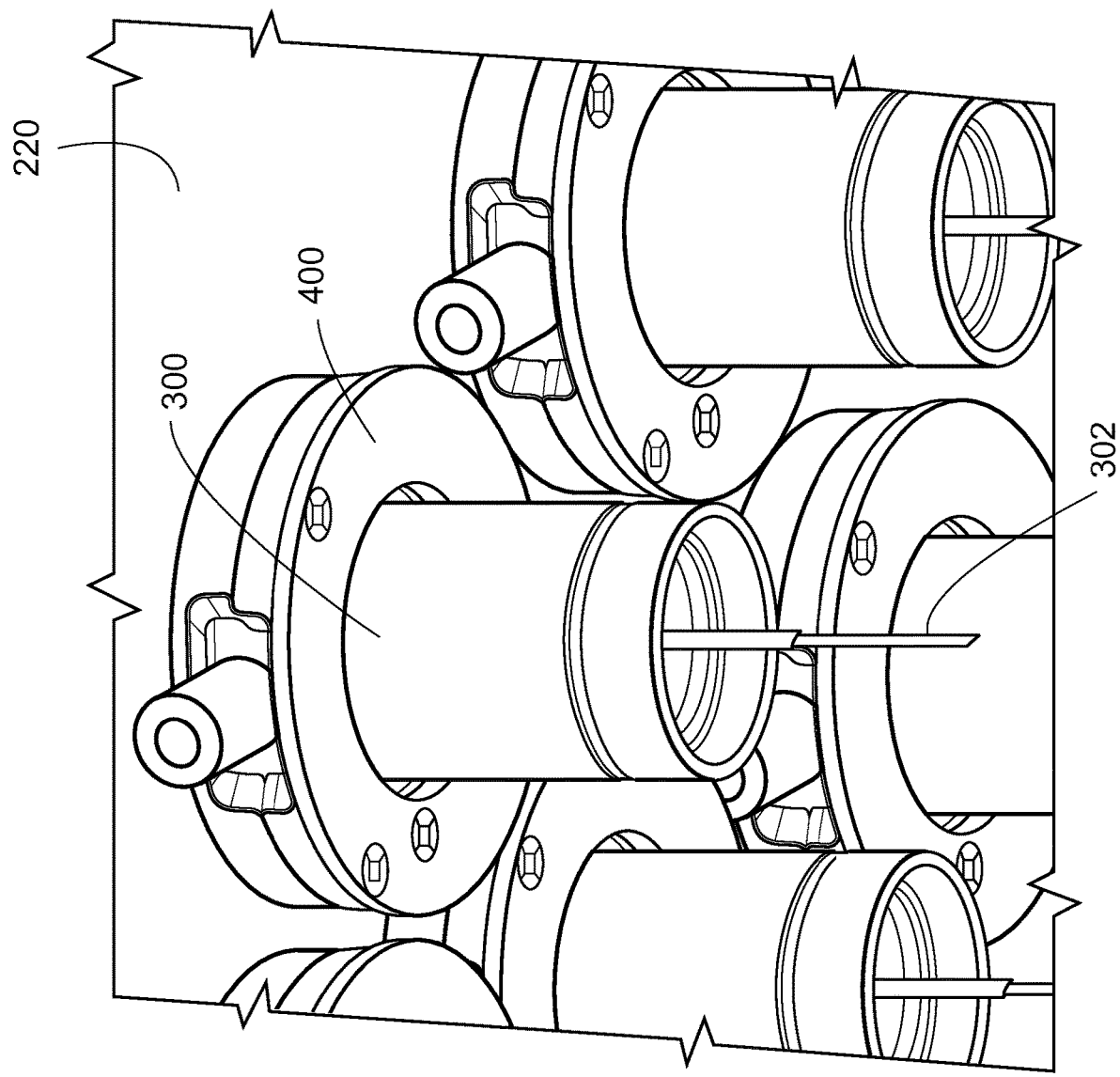
Figure 12:
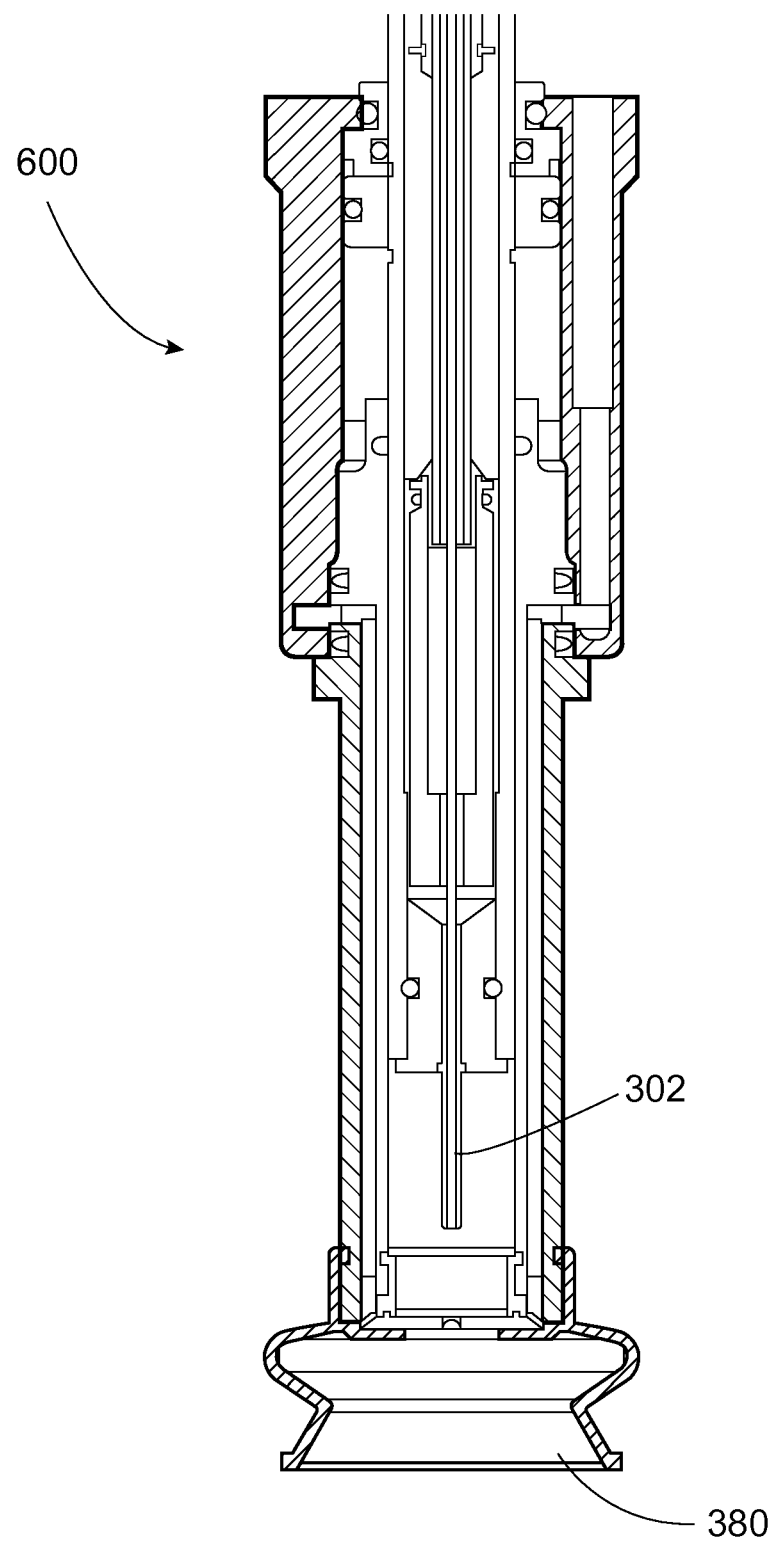
Figure 13:
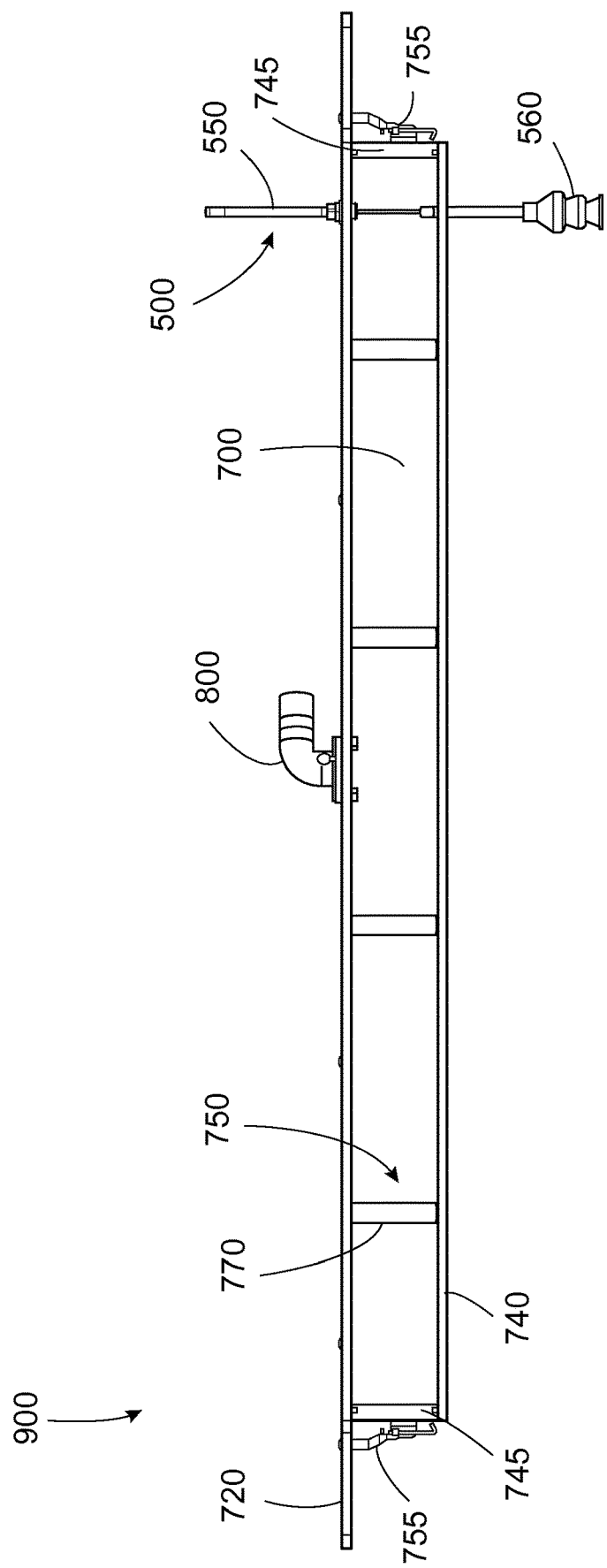
Figure 14:
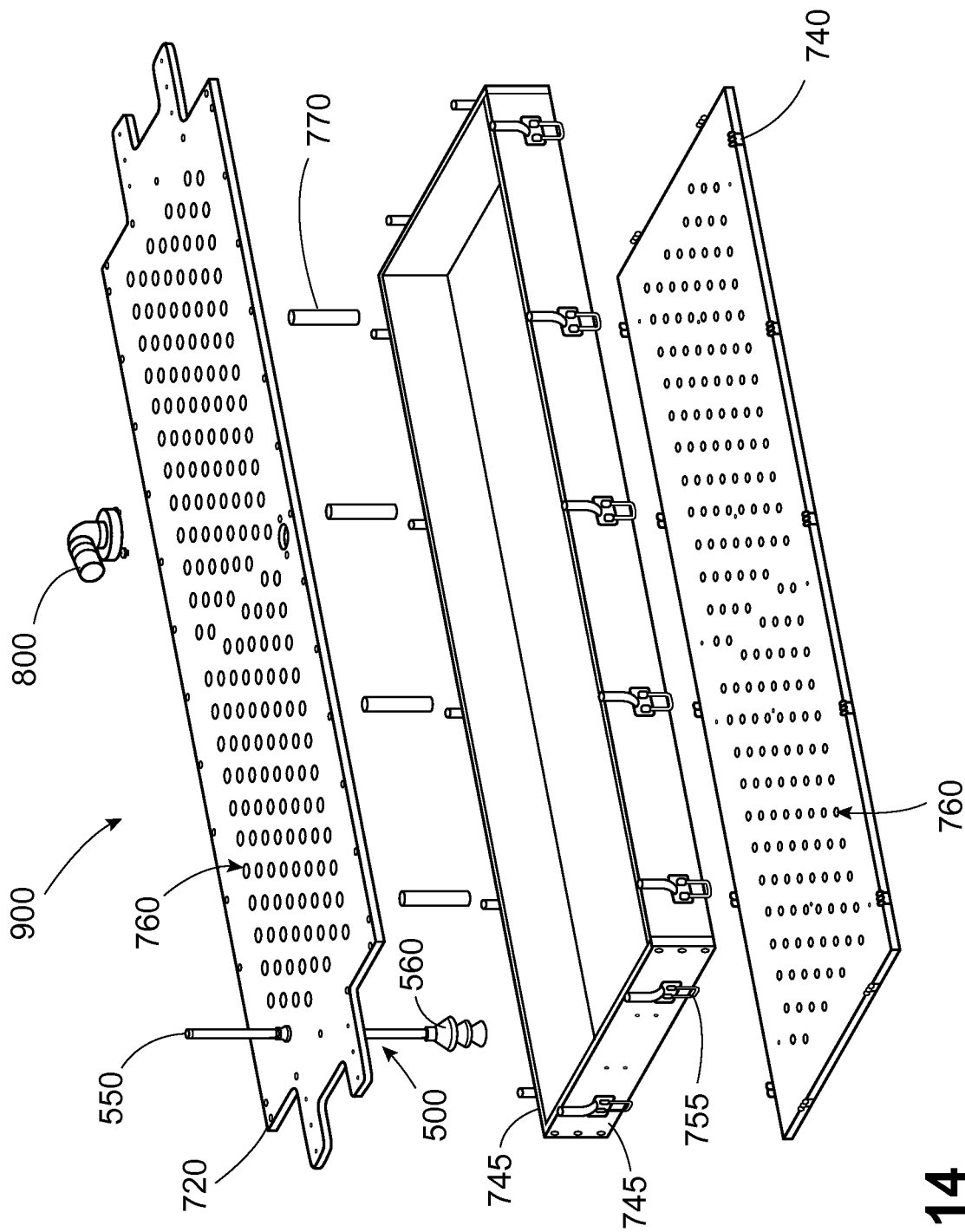

Having thus described various embodiments of the present disclosure in general terms, reference will now be made to the accompanying drawings, which are not necessarily drawn to scale, and wherein:

FIG. 1 is a side view of an egg processing system capable of implementing selective engagement with a plurality of avian eggs, according to one aspect of the present disclosure;

FIG. 2 is a schematic perspective view of an egg processing head, according to one aspect of the present disclosure;

FIGS. 3-5 are schematic cross-sectional views of components of an egg processing head, illustrating selectable engagement aspects of the present disclosure;

FIG. 6 is a sectional perspective view of the egg processing head of FIG. 2, illustrating the transfer head assembly lifting the eggs from the flat;

FIG. 7 is a perspective view of a locking device for use with an egg processing head, according to one aspect of the present disclosure;

FIG. 8 is a schematic cross-sectional view of the locking device of FIG. 7;

FIG. 9 is an exploded view of the locking device of FIG. 7;

FIG. 10 is a schematic sectional perspective view of the egg processing head of FIG. 2, illustrating a plurality of injection devices operably engaged with respective locking devices;

FIG. 11 is a magnified view of the injection and locking devices of FIG. 10;

FIG. 12 is a schematic cross-sectional view of combination injection and transfer device for use with an egg processing head, according to one aspect of the present disclosure;

FIG. 13 is a schematic perspective view of an egg processing head have selectable cylinders, according to one aspect of the present disclosure; and FIG. 14 is an exploded view of the egg processing head of FIG. 13.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates an egg processing apparatus 100. According to this particular aspect shown, the egg processing apparatus 100 is capable of injecting, and, in some instances, transferring, eggs in accordance with various aspects of the present disclosure. Aspects of the present disclosure, however, are not limited to the illustrated egg processing apparatus 100, which is shown as an egg injection apparatus. In some instances, the egg processing apparatus 100 may be capable of both injecting and transferring the eggs. In other instances, the egg processing apparatus 100 may be an egg remover apparatus capable of removing eggs identified as having a certain classification. Further, in still other instances, the egg processing apparatus 100 may be an egg transfer apparatus used to transfer eggs from a setter incubator tray 20 (a so-called "flat") to a hatch incubator tray (a so-called "hatching basket").

As shown in FIG. 1, the egg processing apparatus 100 may be particularly adapted for use in injecting eggs positioned within the flat 20, which includes a plurality of receptacles for individually receiving and maintaining the eggs in a generally vertical orientation. Examples of suitable commercial flats 20 include, but are not limited to, a "CHICKMASTER 54" flat, a "JAMESWAY 42" flat and a "JAMESWAY 84" flat (in each case, the number indicates the number of eggs carried by the flat). Using the egg processing apparatus 100, the eggs may be injected with a treatment substance when positioned below an egg processing head 200.

According to some aspects, the egg processing apparatus 100 may include a frame 110 and a conveyor assembly 112 provided to move the flats 20 in an automated manner through the egg processing apparatus 100 to an injection position. The conveyor assembly 112 may include a guide rail system configured to receive and guide the flats 20 to the injection position. The conveyor assembly 112 may further include appropriate stop elements, sensors, belts, endless loops, motors, etc. for proper indexing and positioning of the flats 20 within the egg processing apparatus 100. In some instances, the flats 20 may be manually advanced through the egg processing apparatus 100.

Eggs entering the egg processing apparatus 100 via the flat 20 may have varying classification characteristics. For example, the flats 20 may include eggs that are classifiable based on viability, pathogen content, genetic analysis, or combinations thereof. As such, eggs are passed through an egg classifier system 115 to generate a classification for each egg contained in the flat 20. Such eggs may be classified as viable or non-viable (i.e., those eggs not containing a viable embryo according to the egg classifier system 115), wherein the non-viable eggs may be further sub-classified as, for example, infertile, rotten, or dead eggs. Exemplary egg classifier systems may be capable of classifying the eggs by using, for example, candling techniques (opacity, infrared, NIR, etc.), assaying techniques, or other known and suitable classification methods, processes, or techniques. After classification, the eggs may be processed accordingly using an appropriate egg processing apparatus 100. Processing of the eggs may refer to injection, removal, transfer, or combinations thereof. For example, in some instances, the egg processing apparatus 100 may be capable of injecting an egg and removing the same egg from the flat 20.

In this regard, aspects of the present disclosure relate to capabilities of the egg processing apparatus 100 to selectably engage or contact eggs contained within the flats 20 according to such classifications. In this manner, eggs may be allowed to pass through one or more egg processing apparatuses 100 without contact. Such processing may be particularly advantageous when the flat 20 contains one or more eggs that have become pressurized due to bacterial build-up. Preventing contact of components associated with the egg processing apparatus 100 with any such eggs may reduce the incidences of exploding eggs (poppers) or transfer of bacterial matter.

According to aspects of the present disclosure, the egg processing apparatus 100 may be configured to selectably engage or contact eggs according to a selectable and mechanical hold scheme. In this regard, the egg processing apparatus 100 may be capable of selectively engaging eggs within the flat 20 having various classification characteristics. For example, the engaged (contacted) eggs may be identified as having a viable (live) classification status, thereby defining a first subset of eggs, while the non-engaged (non-contacted) eggs are identified as having a non-viable (non-live) classification status, thereby defining a second subset of eggs, or a first subset of non-fertile (so-called "clear") eggs and a second subset of all other eggs in the flat 20 not identified as non-fertile. As such, the egg processing apparatus 100 may be capable of selectably engaging or contacting the subsets of eggs contained within the flat 20 according to the classification status for each egg. For example, the viable (live) eggs may be contacted such that an injection sequence may occur, while the non-viable (non-live) eggs are not contacted or otherwise engaged by components of the egg processing apparatus 100. In other instances, the viable (live) eggs may contacted and engaged for transfer from the flat 20 to a hatching basket, while the non-viable (non-live) eggs are not contacted and remain in the flat 20 to move along a processing direction by the conveyor assembly 112. As such, aspects of the present disclosure advantageously facilitate flexible processing of eggs by selectable engagement thereof according to classification.

As shown in FIG. 1, the egg processing apparatus 100 may include an egg processing head 200 coupled to the frame 110 and configured to move vertically for interacting with eggs contained within the flat 20 when in a processing position beneath the egg processing head 200. The egg processing head 200 may be pneumatically driven to move vertically for facilitating interaction with eggs in the flat 20. In some instances, the egg processing head 200 may be lowered and raised pneumatically using a transfer cylinder (not shown) in fluid communication with a pneumatic system, as known by those of skill in the art, along with guide shafts 130 for guiding the egg processing head 200. In some instances, the egg processing head 200 may be capable of lateral movement outside the conveyor assembly 112 and/or the processing position.

The egg processing head 200 may include a plurality of processing devices capable of selectably interacting, engaging, or otherwise contacting the eggs in the flat 20. As particularly shown in FIG. 3, the processing device may be an injection device 300 capable of injecting a treatment substance into an egg, which could also be used as a sampling device. The processing devices may include the injection device 300, an egg remover device (FIG. 13), an egg transfer device (FIG. 13), a sampling device, or a combination injection and transfer device (FIG. 12). The injection devices 300 may include appropriate pneumatic components for operating a needle 302 and/or punch injection sequence. That is, an appropriate pressure is supplied or vacuum drawn using pneumatic components such that a needle and/or punch may be advanced to pierce the egg, with the needle and/or punch (used to punch a hole in the egg prior to insertion of the needle 302) then being withdrawn once injection of a treatment substance is complete. As shown in FIGS. 2-5, the injection devices 300 may include inlet valves configured to fluidly connect to a pneumatic source capable of operating the injection device. Actuation of the injection devices may be commonly controlled or selectively controlled such that the needles are either always advanced out of a housing or selectively advanced as determined by the classification status associated with a respective egg.

As shown in FIGS. 3-5, the egg processing head 200 may include a clamp plate 220 and a lift plate 240. According to some aspects, the clamp plate 220 may be fixed with respect to the egg processing head 200 such that the clamp plate 220 only moves when the egg processing head moves. Furthermore, the clamp plate 220 may be configured to remain stationary during an egg processing sequence. For instance, when the egg processing head 200 descends to its lowest position, the clamp plate may remain at that position until the egg processing sequence is completed. The clamp plate 220 may define a plurality of holes 222 for receiving the injection devices 300. The injection devices 300 are sized to allow vertical and axial movement within the holes 222 such that the injection devices 300 may "float." This also allows the injection devices 300 to tilt to locate an egg that may be vertically off-center within the flat 20. The clamp plate 220 may be used to selectably secure, fasten, or otherwise fix the injection devices 300 to the clamp plate 200 at various points along each injection device 300.

The lift plate 240 may operate in conjunction with the clamp plate 220 to facilitate the selectable engagement or selectable contact features of the present disclosure. The lift plate 240 may be spaced apart from the clamp plate 220 in a substantially parallel manner and is moveable with respect thereto, as illustrated in FIGS. 3-5. The lift plate 240 may define a plurality of apertures 242 for receiving the injection devices 300. Each injection device 300 may include a flange 304 (FIG. 2) that interacts with the lift plate 240 to move the injection devices 300 vertically (substantially perpendicular with respect to the egg processing direction) in either direction therewith such that the injection devices 300 can ascend and descend independently of the movement of the egg processing head 200. In this manner, the lift plate 240 may be used to move the injection devices 300 to various positions within the holes 222 of the clamp plate 220. The lift plate 240 may be moved using appropriate mechanisms such as pneumatics, hydraulics, or other similar means for moving structures. The injection devices 300 are sized to allow vertical and axial movement within the apertures 242 such that the injection devices 300 may "float." This also allows the injection devices 300 to tilt to locate an egg that may be vertically off-center within the flat 20.

As shown in FIGS. 6-11, a plurality of locking devices 400 may form part of or otherwise be secured to the clamp plate 220. The locking devices 400 are capable of securing the injection devices 300 to the clamp plate 220 in a fixed manner. In this regard, each injection device 300 may be fixed at various points along a longitudinal axis thereof at the clamp plate 220. Each locking device 400 may be individually actuated such that the locking devices 400 are separately, individually, and selectably controllable.

According to one aspect, the locking device 400 may operate pneumatically to secure the injection device 300 to the clamp plate 220. In some instances, the locking device 400 may include an inflatable member 450 used to secure a respective injection device 300 to the clamp plate 220. The inflatable member 450 may include a bladder 402 that cooperates with a rigid body member 404 such that the bladder 402 can inflate to secure a respective injection device 300 to the clamp plate 220. In this regard, the bladder 402 may define an open channel 406 configured to mate with an interior channel 408 of the rigid body member 404 to define an air channel 410. Pressurized air may be supplied to the air channel 410 via a connector 412 used to connect the locking device 400 and the air channel 410 to a pressurized air source (not shown). The pressurized air inflates the bladder 402 and expands an inner wall 430 of the bladder 402 radially inward so as to be capable of clamping a respective injection device 300 disposed therewithin. First and second housing members 414, 416 may cooperate to contain the inflatable member 450 and provide the locking device 400 in a form suitable for operably engaging the clamp plate 220, wherein appropriate fasteners 418 may be used to secure the first and second housing members 414, 416 together. At least a portion of the locking device 400 may be positioned or seated within the holes 222 of the clamp plate 220, and maintained in position using appropriate fastening mechanisms. A sealing member (e.g., O-ring) 420 may be provided to assist with positioning of the locking device 400 within the hole 222. While the components of the inflatable member 450 and the housing are shown as substantially annular, the present disclosure is not limited to such configurations. Further, in some instances, the bladder 402 may not be fully formed as an annular ring. That is, in some instances, the ends of the bladder 402 may terminate such that it forms a C-shape.

FIGS. 1 and 3-5 illustrate a sequence of operations for an exemplary egg processing apparatus 100. In the exemplary egg processing apparatus 100, a plurality of eggs 5 are classified using the egg classifier system 115 employing light measuring (candling device), in which light is transmitted through an egg and assessed by a light detector. The eggs 5 may be identified, for example, as either live or non-live. The light detectors or other detection mechanism may be operatively connected directly to a controller 150 (which may be a microprocessor or other programmable or non-programmable circuitry), or to another controller capable of transmitting the information to the controller 150 such that the controller 150 receives the classification status indirectly.

As shown in FIG. 1, the conveyor assembly 112 moves the eggs 5 stored in the flat 20 past the egg classifier system 115 so that each egg 5 passes therethrough such that data (egg classification status) may be generated for each egg 5. The data collected by the egg classifier system 115 may be provided to the controller 150 (or another controller) for processing and storing data associated with each egg 5. The controller 150 may then be capable of generating a selectable hold signal to send to the locking devices 400 so that individual injection devices 300 (or subsets of injections devices) are separately secured to the clamp plate 220 at various positions (contact or non-contact) according to the classification status for each egg based on the data collected by the egg classifier system 115.

As shown in FIG. 1, the flat 20 of eggs may be conveyed to the injection position beneath the egg processing head 200. In some instances, the egg processing head 200 may be capable of processing multiple flats 20 at a time. Prior to the flat (or flats) 20 being positioned beneath the egg processing head 200, the egg processing head 200 may be lowered to a predetermined fully descended position such that the clamp plate 220 is also at its fully descended and stationary position, as shown in FIG. 3. It will be understood, however, that in some instances the egg processing head 200 and the clamp plate 220 may be fixed at a predetermined position wherein the only movement associated with the egg processing head 200 is that of the lift plate 240, using appropriate pneumatics, hydraulics, etc. As shown in FIG. 3, injection devices 300a, 300b, and 300c are in a fully descended position without eggs therebeneath and without the respective locking devices 400 being actuated such that the injection devices 300 can be retracted.

As shown in FIG. 4, injection devices 300a, 300b, and 300c are raised to a fully retracted position. At this point, information regarding egg classification status for each egg 5 in the upcoming flat 20 is being conveyed to the locking devices 400 and/or the components associated therewith such that the locking devices 400 can secure the injection devices 300 associated with non-live eggs in a non-contact position. That is, the locking devices 400 associated with non-live eggs are pressurized to inflate the inflatable member 450 about the injection device 300b such that the injection device 300 is secured and prevented from further descending. After the eggs 5 move beneath the egg processing head 200, as shown in FIG. 5, the lift plate 240 lowers to a maximum range such that eggs 5 identified as live are contacted (contact position) by the injection devices 300. For example, as shown in FIG. 5, the eggs 5 associated with the injection devices 300a and 300c have been identified as live and, as such, the locking devices 400 associated with injection devices 300a and 300c are not actuated such that injection devices 300a and 300c can be lowered to contact the respective eggs 5.

Meanwhile, the locking device 400 associated with injection device 300b is actuated due to the identification of the egg 5 associated therewith as non-live such that the injection device 300b is secured in a non-contact position and the lift plate 240 descends without lowering the injection device 300b. Because the injections devices 300 are permitted to float, the contact position may be different for different sized eggs, as shown in FIG. 5 with respect to injection devices 300a and 300c. Once the injection devices 300a and 300c have reached the contact position, the locking devices 400 associated with injection devices 300a and 300c are actuated to lock the injection devices 300a and 300c in position prior to an injection sequence. After the injection sequence occurs, the egg processing head 200 may be raised and the egg flat 20 conveyed out from beneath the egg processing head 200. The locking devices 400 may then be released and the lift plate 240 raised such that the injection devices 300 are ready for positioning. In this manner as previously described in detail, the egg processing devices are capable of selectably engaging the eggs of a flat 20 in a contact or non-contact position according to classification.

In some instances, as shown in FIG. 5, the needle 302 and/or punch may be actuated for each injection device 300 regardless of the egg classification status. In this regard, the injection devices 300 associated with the non-live eggs should be secured with the clamp plate 220 at a predetermined distance designed to allow for clearance between the egg and the needle at maximum stroke thereof such that the needle 302 does not contact the egg 5. In some instances, the injection devices 300 may be configured to receive the egg classification status such the needles 302 and/or punches may be selectively actuated as well.

As shown in FIGS. 10 and 12, the injection device 300 may also include a vacuum cup 380 configured to sealingly enclose a top portion of the egg such that the egg may be lifted when a vacuum is applied. The embodiment shown in FIGS. 10 and 12 is a combination injection and transfer device 600 in which the egg may be lifted from the flat 20 and then injected with a treatment substance via the needle 302, which extends through a central hole (not shown) in the vacuum cup 380. In other instances, the injection and transfer device 600 may inject an egg first and then remove the egg from the flat 20. In any manner, the injection and transfer device 600 may be incorporated into the selectable mechanism described herein such that the injection and transfer device 600 is capable of selectable injection and removal in a contact/non-contact manner.

According to another aspect of the present disclosure, as shown in FIGS. 13 and 14, the egg processing head 200 may be an egg removal head 900 capable of removing eggs from the flats 20 for discard or transfer. The egg processing head 200 may be pneumatically driven to move vertically for facilitating interaction with eggs in the flat 20. In some instances, the egg processing head 200 may be lowered and raised pneumatically using a transfer cylinder 120 in fluid communication with a pneumatic system, as known by those of skill in the art, along with guide shafts 130 for guiding the egg processing head 200. In some instances, the egg processing head 200 may be capable of lateral movement outside the conveyor assembly 112 and/or the processing position.

In some instances, the egg processing devices may be selectably controlled using pneumatically controlled cylinders. For example, a plurality of transfer or removal devices 500 (only one shown for clarity) may be configured for selectably engaging respective eggs such that only those eggs identified as a first subset (e.g., as live or viable) of eggs are contacted for removal or transfer from the flat 20. In such instances, a second subset (e.g., non-live or non-viable) of eggs may remain in the flat 20 without coming into contact with any of the transfer/removal devices 500.

As shown in FIG. 13, the transfer/removal device 500 may be operably engaged with a manifold 700 of the egg processing head 200. In some instances, the transfer/removal device 500 may be in fluid communication with the manifold 700 such that the transfer/removal device 500 may commonly receive a vacuum or negative air pressure for lifting the eggs in contacting relationship with the transfer/removal device 500 for removal from the flat 20. The manifold 700 may be formed using opposing plates 720, 740 and sidewalls 745 coupled to form a chamber 750 capable of being air-tight for holding a vacuum. The plates 720, 740 and sidewalls 745 may be secured together with any suitable attachment means, including, for example, latches, clamps 755, linkages, bolts, and fasteners. The opposing plates 720, 740 may include aligned apertures 760 for receiving the transfer/removal devices 500 therethrough. One or more spacers 770 may provide supporting structure between the opposing plates 720, 740.

A vacuum blower device 800 may be in fluid communication with the manifold 700 to supply negative air pressure thereto for facilitating removal of the eggs from the flat 20 using the transfer/removal device 500. In some instances, the vacuum blower device 800 may also be capable of providing positive air pressure to the manifold 700 for facilitating or aiding a common release of all eggs in contact with the transfer/removal devices 500. That is, the vacuum blower device 800 may be capable of switching between supplying negative air pressure and positive air pressure to the manifold 700 (and all the transfer/removal devices 500) so as to achieve a desired action. While simply eliminating the vacuum would be sufficient to release the eggs from the transfer/removal devices 500, at least some positive air pressure may be desirably applied to ensure the eggs are released from the transfer/removal devices 500 in a consistent and controllable manner. The vacuum blower device 800 may be in fluid communication with the manifold 700 using tubing or other suitable fluid connection means.

Vacuum may be generated by the vacuum blower device 800 such that the eggs 5 are suctioned against the transfer/removal device 500. The manifold 700 may be raised and lowered using a transfer cylinder or other means such as those described previously with respect to the egg processing head 200 such that the eggs 5 are removed and lifted from the flat 20. Once removed from the flat 20, the eggs 5 may be lifted, lowered or released (selectively or non-selectively) by the egg processing head 200 in various manners, sequences, or steps according to a desired processing scheme implemented on the egg processing apparatus 100.

Each transfer/removal device 500 may include a pneumatically controlled cylinder 550 capable of advancing and retracting a lifting member 560 between a contact and non-contact position. Similar to the process described previously, each cylinder 550 is capable of receiving a signal indicating the egg classification status of respective eggs in the flat 20 such that the cylinders 550 may be selectably actuated, thereby only facilitating engagement or contact of certain lifting members 560 with respective eggs. By selectably actuating the cylinders, interaction of components of the transfer/removal device 500 with non-live or otherwise undesirable eggs may be advantageously avoided.

According to one aspect of the present disclosure, the egg processing head 200 and associated components of FIGS. 1-12 may be used in combination with the egg processing head 200 illustrated in FIGS. 13 and 14 to provide a system having a module capable of egg removal, another module capable of injection, and another module capable of egg transfer. In this manner, it is conceivable that an egg removal module may first remove a first subset of eggs (e.g., infertile/clear eggs) from the flat 20 in a contact/non-contact selectable manner such that certain eggs in the flat 20 are not contacted. Then, the eggs may be conveyed to an egg injection module capable of injecting a second subset of eggs (e.g, live eggs), according to classification, without contacting a third subset of eggs (e.g., poppers) as identified by the egg classifier system 115. Next, the eggs may be conveyed to an egg transfer module wherein the previously identified second subset of eggs is transferred from the flat 20 to a hatching basket, while the previously identified third subset of eggs remains in the flat 20 untouched such that this third subset moves through the system without contacting any components or egg processing devices thereof. Such a system may advantageously reduce the transfer of bacteria between one flat and another as each advance along a processing stream.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg injection apparatus, comprising:
an egg processing head;
a plurality of injection devices operably engaged with the egg processing head so as to be capable of moving in a substantially vertical direction thereby, each injection device having an end configured to contact an avian egg and further having at least one of a needle and a punch configured to pierce the avian egg; and
wherein the end of each injection device is capable of selectably engaging the egg such that the injection devices are selectively held in one of a non-contact position and a contact position during an injection sequence such that a first subset of the ends of the injection devices is in the non-contact position while simultaneously during the injection sequence having a second subset of the ends of the injection devices in the contact position contacting the respective eggs, the non-contact position being at a vertical height above the contact position such that the ends of the first subset of injection devices are selectively held above the ends of the second subset of injection devices.

2. An egg injection apparatus according to claim 1, wherein the egg processing head has a clamp plate defining a plurality of holes for receiving the injection devices, the clamp plate being configured to selectively secure each injection device in one of the non-contact position and the contact position.

3. An egg injection apparatus according to claim 2, further comprising a plurality of annular locking devices seated within the holes of the clamp plate, each annular locking device defining an annular opening through which the injection device moves substantially vertically, and each annular locking device being configured to individually secure a respective injection device in one of the non-contact position and the contact position during the injection sequence.

4. An egg injection apparatus according to claim 3, wherein each annular locking device comprises a pneumatic valve in communication with a positive air supply system, the pneumatic valve being configured to facilitate locking of the injection devices pneumatically.

5. An egg injection apparatus according to claim 4, wherein each locking device comprises a rigid body member cooperating with a bladder to form an air channel such that the bladder is capable of being pneumatically inflated for securing the annular locking devices in the non-contact and contact positions.

6. An egg injection apparatus according to claim 3, wherein each annular locking device comprises an inflatable member capable of being pneumatically inflated for securing the annular locking devices in the non-contact and contact positions.

7. An egg injection apparatus according to claim 1, further comprising an egg classifier system configured to classify an avian egg as one of engageable and non-engageable, the egg classifier system being in one of direct and indirect communication with the injection devices so as to instruct positioning of each injection device in one of the non-contact and contact positions during the injection sequence.

8. An egg injection apparatus according to claim 1, further comprising a conveyor assembly configured to automatically convey avian eggs to the egg processing head for injection thereof.

9. A method of selectively injecting avian eggs, the method comprising:
   providing a plurality of injection devices being in alignment with a plurality of avian eggs, each injection device having an end configured to contact a respective avian egg and further having at least one of a needle and a punch configured to pierce the avian egg;
   securing a first subset of the injection devices in a non-contact position at a first height with respect to the eggs such that the ends of the injection devices do not contact the respective avian eggs;
   descending a second subset of the injection devices lower than the first height so as to engage the ends thereof with respective avian eggs aligned therewith;
   securing the ends of the second subset of injection devices in a contact position with respect to the corresponding eggs; and
   injecting a treatment substance into the avian eggs engaged with the ends of the second subset of injection devices, while simultaneously the ends of the first subset of injection devices are spaced-apart from the eggs in the non-contact position.

10. A method according to claim 9, wherein the steps of securing a first and second subset of the injection devices further comprises selectively securing the first and second subsets with a clamp plate configured to selectively hold each injection device in one of the non-contact position and the contact position, the clamp plate defining a plurality of holes for receiving the injection devices.

11. A method according to claim 10, wherein selectively securing the first and second subsets further comprises selectively securing the first and second subsets with a plurality of annular locking devices seated within the holes of the clamp plate, each annular locking device defining an annular opening through which the respective injection device moves substantially vertically, and each annular locking device being configured to individually secure a respective injection device in one of the non-contact position and the contact position.

12. A method according to claim 11, wherein selectively securing the first and second subsets with a plurality of annular locking devices further comprises pneumatically inflating an annular resilient member of each locking device so as to selectively secure the annular locking devices in one of the non-contact and contact positions.

13. A method according to claim 12, wherein pneumatically inflating a bladder of each locking device further comprises pressurizing an air channel formed by cooperation of the bladder with a rigid body member.

14. A method according to claim 11, further comprising the step of classifying each avian egg as one of engageable and non-engageable, and further comprising the step of communicating the classification of each avian egg to the respective annular locking device so as to instruct positioning of each injection device in one of the non-contact and contact positions.

15. A method according to claim 9, further comprising the step of automatically conveying the avian eggs for alignment with the injection devices.

* * * * *